United States Patent [19]

Yagami

[11] Patent Number: 5,042,873
[45] Date of Patent: Aug. 27, 1991

[54] DETACHABLE ROOF STRUCTURE FOR AUTOMOTIVE VEHICLE

[75] Inventor: Kouichi Yagami, Zama, Japan

[73] Assignee: Nissan Motor Co., Ltd., Yokohama, Japan

[21] Appl. No.: 504,083

[22] Filed: Apr. 3, 1990

Related U.S. Application Data

[63] Continuation of Ser. No. 281,899, Dec. 6, 1988, abandoned, which is a continuation of Ser. No. 60,540, Jun. 11, 1987, abandoned.

[30] Foreign Application Priority Data

Jun. 13, 1986 [JP] Japan .................. 61-136180

[51] Int. Cl.⁵ ............................................. B60J 7/11
[52] U.S. Cl. ............................ 296/218; 49/493; 296/216
[58] Field of Search ............ 296/216, 218, 221, 222; 49/493

[56] References Cited

U.S. PATENT DOCUMENTS 3,261,133  7/1966  Herr et al. .......................... 296/222
3,972,558  8/1976  Horn ................................. 296/218
3,981,531  9/1976  Koral et al. ....................... 296/222
4,729,596  3/1988  Fujihara et al. .................. 296/218

FOREIGN PATENT DOCUMENTS 128010  7/1984  Japan ............................... 296/222
746608  3/1956  United Kingdom ............... 296/222
927805  6/1963  United Kingdom ............... 296/224

Primary Examiner—Dennis H. Pedder
Attorney, Agent, or Firm—Foley & Lardner

[57] ABSTRACT

A detachable roof structure forming part of an automotive vehicle body and including a roof outer panel constituting a vehicle roof. A lid member is detachably installed to the roof outer panel in such a manner as to cover or close an opening formed in the roof. The lid member is made up of inner and outer panels whose peripheral sections are securely joined together by hemming thereby to form a peripheral edge of the lid member. Additionally, a weatherstrip is securely installed through a retainer to the lid member and located along the peripheral edge of the lid member thereby to maintain a seal between the lid member and the roof outer panel.

7 Claims, 2 Drawing Sheets

DETACHABLE ROOF STRUCTURE FOR AUTOMOTIVE VEHICLE

This application is a continuation of application Ser. No. 07/281,899, filed Dec. 6, 1988, abandoned which is a continuation of Ser. No. 07/060,540 filed June 11, 1987, abandoned.

BACKGROUND OF THE INVENTION

1. Field of the Invention

The present invention relates generally to a detachable roof structure for an automotive vehicle, and more particularly to an improvement in such a roof structure of the type wherein a lid member is detachably disposed so as to cover an opening formed in a roof of a vehicle body.

2. Description of the Prior Art

A. variety of detachable roof structures have been proposed and put into practical use in the field of automotive vehicles. A typical one of them is configurated as follows: A roof outer panel constituting a roof of an automotive vehicle is formed with an opening through which a passenger compartment is open to air. A lid member is detachably installed to the roof outer panel so as to cover the opening. The lid member is made up of inner and outer panels which are joined together other to form a one-piece structure by bending the peripheral sections of them downwardly and then spot-welding the bent peripheral sections to form a bent flange section of the lid member. Additionally, a weatherstrip is secured to the bent flange section to maintain a seal between the lid member and the roof outer panel.

However, difficulties have been encountered in the thus configured roof structure. For example, in connection with the forming process for the bent flange section of the lid member, the radius of curvature of the bent flange section unavoidably becomes larger. Additionally, the height of the flange section unavoidably becomes larger to ensure a dimension for allowing spot-welding. These considerably restrict freedom in design. In addition, water is allowed to enter between the flange section and the inner wall of the weatherstrip through depressions formed by spot-welding, so that the flange section tends to become rusted.

SUMMARY OF THE INVENTION

A detachable roof structure for an automotive vehicle, according to the present invention is comprised of a lid member detachably disposed to a roof outer panel to close or cover an opening formed in the roof outer panel. The roof outer panel constituting a roof of the automotive vehicle. The lid member is made up of inner and outer panels whose peripheral sections are securely joined together by hemming thereby to form a peripheral edge of the lid member. Additionally, a weatherstrip is securely supported by a retainer secured to the lid member thereby to maintain a seal between the lid member and the roof outer panel.

Thus, the inner and outer panels of the member are joined together by hemming, and additionally the weatherstrip is installed through the retrainer disposed along the peripheral edge of the lid member. This minimizes the radius of curvature of the peripheral edge of the lid member thereby enhancing freedom in design. Furthermore, water is prevented from being collected at a location near the end edge of the inner and outer panels, thereby improving rust-prevention of the lid member.

DETAILED DESCRIPTION OF THE INVENTION

Figure 1:
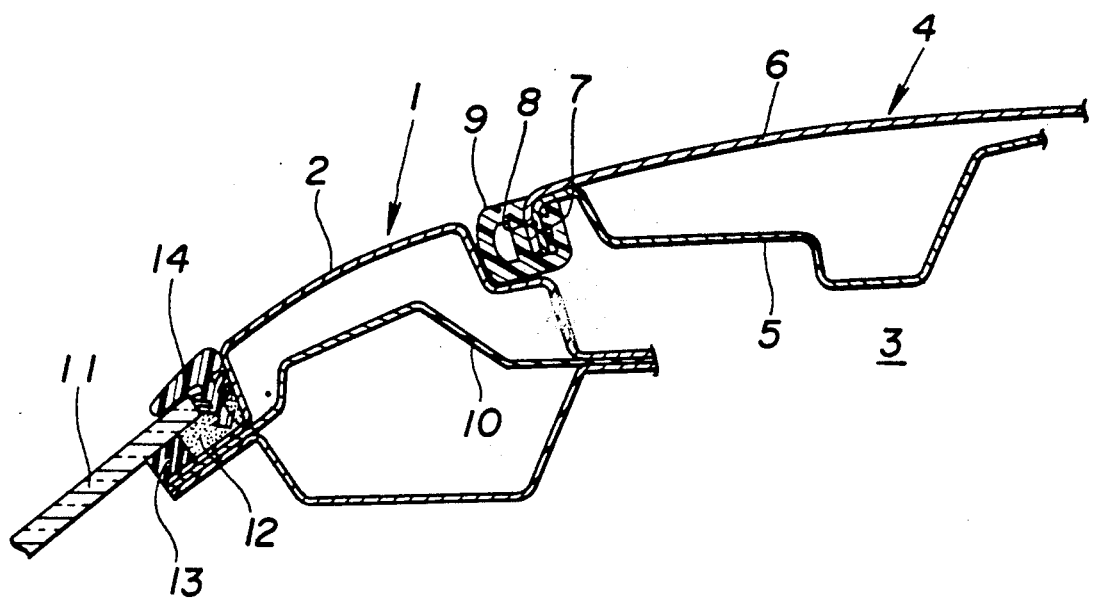
FIG. 1 is a fragmentary vertical sectional view of a conventional detachable roof structure for an automotive vehicle.

To facilitate understanding of the present invention, a brief reference will be made to a conventional detachable roof structure, depicted in FIG. 1. Referring to FIG. 1, the conventional detachable roof structure includes a roof outer panel 2 constituting a roof 1 of an automotive vehicle. The roof panel 2 is formed with an opening 3 which is normally closed with a lid member 4. The lid member 4 is detachable from the roof outer panel 2 to leave the opening 3. The lid member 4 is made up of inner and outer panels 5, 6 which are joined with each other by a method in which the peripheral sections of panels 5,6 are bent downwardly to from a flange section 7 and then spot-welded at a point 8. A weatherstrip 9 is installed to the rid member flange section 7 to maintain a seal between the roof panel 2 and the lid member 4. As shown, a front door rail 10 is provided to support the roof outer panel 2. A front windshield glass 11 is securely installed to the roof outer panel 2 by means of adhesive 12. A rubber dam 13 is securely interposed between the windshield glass 11 and the roof outer panel 2 to avoid protrusion of the adhesive 12. Additionally, a molding 14 is installed to cover the clearance between the windshield glass 11 and the roof outer panel 2.

However, the following difficulties have been encountered in such a conventional detachable roof structure: In connection with the forming process for the flange section 7, a bent portion at the peripheral section of the lid member 4 unavoidably become larger in radius of curvature. Additionally, the flange section 7 must have a considerable height for the purpose of ensuring such a dimension as to allow spot welding. These restrict the freedom in design of the detachable roof structure. Furthermore, water enters between the lid flange section 7 and the inner wall of the weatherstrip 9 through depressions formed by the spot welding at the point 8, so that the end portion of the flange section 7 tends to be rusted. In this connection, particularly careful coating must be applied onto the end section of the flange section 7.

Figure 2:
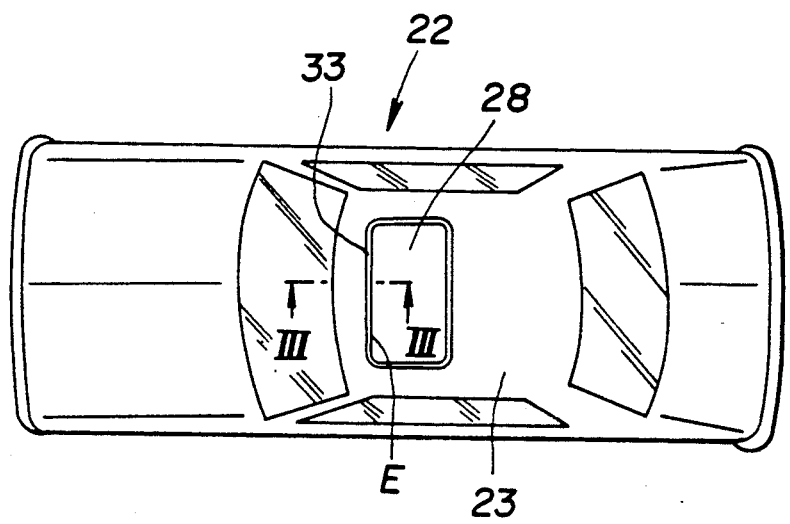
FIG. 2 is a plan view of an automotive vehicle provided with an embodiment of a detachable roof structure in, accordance with the present invention.
Figure 3:
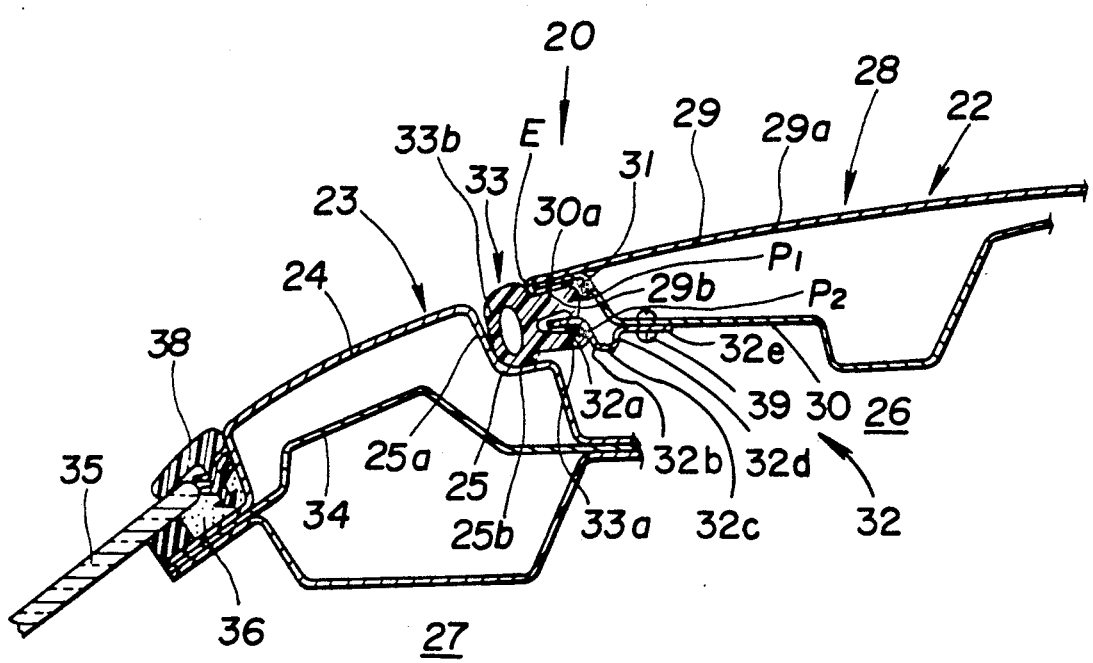
FIG. 3 is a fragmentary vertical sectional view taken in the direction of arrows substantially along the line III—III of FIG. 2.

In view of the above description of the conventional detachable roof structure, reference is now made to FIGS. 2 and 3 wherein a preferred embodiment of a detachable roof structure of an automotive vehicle, according to the present invention is illustrated by the reference numeral 20. The roof structure 20 forms part of a body 22 of an automotive vehicle. The vehicle body 22 includes a roof 23 made up of a roof outer panel 24 which is formed with a continuous step-like section 25 positioned inside relative to the outer surface of the roof 23. The continuous step-like section 25 defines a rectangular opening 26 through which a vehicle passenger compartment 27 is opened to atmospheric air. A lid member 28 is detachably installed to the roof outer panel 24 in such a manner that the opening 26 is closed when the lid member 28 is in position while the opening 26 is formed when the lid member 28 is detached from the roof outer panel 24.

The lid member 28 is made up of inner and outer panels 29, 30 which are joined with each other by hemming thereby to form a one-piece structure. More specifically, the peripheral section 29b of the outer panel 29 is bent on the peripheral section 30a of the inner panel 30 so that the inner panel peripheral section is put between the main section 29a and the bent peripheral section 29b of the outer panel 29. As a result, the inner panel peripheral section 30a is tightly and securely put between the outer panel main and peripheral section 29a, 29b. Additionally, paint seal material or sealant 31 is coated at the edge of the peripheral section 29b of the outer panel 29 in such a manner as to maintain seal between the outer and inner panels 29, 30. A retainer 32 for securely supporting a weatherstrip 33 is fixed to the inner panel near the peripheral section 30a by means of rivets 39, and extends along the peripheral edge E of the lid member. The cantilever-type retainer 32 has a first flange section 32a projecting outwardly in such a manner as to be generally parallel with the peripheral sections 29b, 30a of the outer and inner panels 29, 30. Retainer 32 also has a second flange section 32b projecting downward from the first flange section in a generally vertical direction; a third flange section 32c generally parallel with outer panel 29; a fourth flange section 32d projecting upward from the third flange section in a generally vertical direction; and a fifth flange section 32e generally parallel to panel 30.

The weatherstrip 33 includes a supportable section 33a and a sealing section 33b. The supported section 33a is securely supportable to the retainer flange section 32a so that the weatherstrip 33 is installed along the peripheral edge E of the lid member 28 as best shown in FIG. 2. More specifically, the supportable section 33a is formed with a cut groove (no numeral) in which the retainer flange section 32a is securely inserted. The supportable section 33a includes outer and inner parts P₁, P₂ which are located opposite to each other with respect to the cut groove and the retainer flange section 32a. Accordingly, the outer part P₁ is secured between the outer panel bent peripheral section 29a and the retainer flange section 32a. Also, inner part P₂ abuts the corner between the first flange section 32a and the second flange section 32b. The sealing section 33b is integral with the supportable section 33a and located between L the generally vertical wall 25a of the roof outer panel step section 25 and the lid member peripheral edge E. The sealing section 33b is formed at its bottom part with a contacting surface which can be brought into tight contact with the generally horizontal and flat wall 25b, so that sealing between the lid member 28 and the roof outer panel 24 is made in a generally vertical direction. In other words, the sealing section 33b of the weatherstrip 33 is pressed at its contacting surface onto the surface of the horizontal wall 25b upon receiving a generally vertical load due to the weight of the lid member 28 and due to pressing installation of the lid member 28 onto the roof outer panel 24.

As illustrated in FIG. 3, a front roof rail 34 is provided to support the roof panel 2. A front windshield glass 35 is securely installed to the roof outer panel 24 by means of adhesive or sealant 36. A rubber dam 37 is securely interposed between the windshield glass 35 and the roof panel 2 to avoid protrusion of the adhesive 36. Additionally, a molding 38 is installed to cover the clearance between the windshield glass 12 and the roof outer panel 24.

With the thus arranged detachable roof structure 20, since the peripheral edge E of the lid member 28 is formed by hemming, the peripheral edge has a smaller radius of curvature, thereby increasing freedom in design of the roof structure 20. Furthermore, water is prevented from being collected at a position between the lid member 28 and the weatherstrip 33, thereby contributing to rust-prevention of the lid member 28. Moreover, in this embodiment, the weatherstrip 33 is arranged to contact at its bottom part with the roof outer panel 24 to accomplish pressing contact in a generally vertical direction, and therefore an allowable range for maintaining a tight seal between the weatherstrip 33 and the roof outer panel 24 is larger than in the conventional detachable roof structure as shown in FIG. 1 in which the seal is made between the side wall surface of the weatherstrip 9 and the generally vertical wall surface of the roof outer panel 2 thereby to accomplish a contacting seal in a generally lateral direction. Thus, the detachable roof structure 20 of this embodiment is greatly improved in resistance against the strain of the vehicle body due to production tolerance of various parts constituting the vehicle body 22.

What is claimed is:

1. A detachable roof structure for an automotive vehicle, comprising:

a roof panel constituting a portion of said roof structure of said vehicle and defining therein an opening, said roof panel including a step section formed therein, said step section having a generally horizontal wall;

a lid member detachably disposed relative to said roof panel so that said opening is closable with said lid member, said lid member including an inner panel and an outer panel, said inner and outer panels each having a respective peripheral section;

means for securely joining said peripheral sections of said inner and outer panels with each other to form a peripheral edge of said lid member;

a cantilever-type retainer member secured to said lid member and spaced from said peripheral edge of said lid member; and a weatherstrip securely supported by said retainer member to maintain a seal between said lid member and said roof panel, said weatherstrip having
a bottom surface which is in tight contact with a surface of said horizontal wall of said roof panel,
a top surface portion in proper coordination with said outer panel to form a junction with said lid member and said weatherstrip to prevent water from penetrating from outside to inside said lid member,
a first u-shaped section including two legs, each of said legs engaging a respective opposite side of said retainer member such that a first one of said legs is between on side of said retainer member and said peripheral edge, and a second one of said legs is located below said retainer member engaging another side of said retainer member, opposite said one side, and
a second sealing section, attached to said first U-shaped section and extending between said retainer member and said step section, said bottom surface and said top surface portion being part of said second sealing section;

wherein said retainer member is secured to said inner panel and includes a first flange section located between said legs projecting away from a remaining portion of said retainer member;

wherein said first flange section is generally parallel with said outer panel peripheral section and said remaining portion of said retainer member includes a second flange section projecting generally vertically downwards in relation to said first flange section, a third flange section generally parallel with said outer panel, a fourth flange section projecting generally upwards in relation to said third flange section and a fifth flange section projecting generally parallel to said inner roof panel and by which said retainer member is secured to said inner roof panel.

2. A detachable roof structure as claimed in claim 1, wherein said means for joining comprises said peripheral section of said outer panel which is bent around said peripheral section of said inner panel so that said inner panel peripheral section is secured between a bent around portion of said outer panel.

3. A detachable roof structure as claimed in claim 1, wherein said second sealing section of said weatherstrip also extends between said peripheral edge of said lid member and a generally vertical wall forms part of said step section of said roof panel.

4. A detachable roof structure as claimed in claim 3, wherein said first u-shaped section is formed with a groove between said two legs in which said retainer member first flange section is insertable and the leg below the retainer abuts a corner between the first and second flange section of said retainer.

5. A detachable roof structure as claimed in claim 2, further comprising sealant for sealing said peripheral sections of said lid member inner and outer panels.

6. A detachable roof structure as claimed in claim 5, wherein said peripheral edge of said lid member is generally rectangular and wherein said weatherstrip and said horizontal wall extend along said peripheral edge of said lid member.

7. A detachable roof structure for an automotive vehicle, comprising:

a roof panel constituting a roof of said vehicle and defining therein an opening, said roof panel including a step section formed therein, said step section having a generally endless horizontal wall extending along a periphery of said opening;

a lid member detachably disposed relative to said roof panel so that said opening is closable with said lid member, said lid member including an inner panel and an outer panel, said inner and outer panels having peripheral sections, respectively;

means for securely joining said peripheral sections of said inner and outer panels with each other to form a peripheral edge of said lid member;

a retainer member secured to said inner panel and spaced from said peripheral edge including a first flange section projecting away from said inner panel and generally parallel with said outer panel, a second flange section projecting generally vertically downwards in relation to said first flange section, a third flange section generally parallel with said outer panel, a fourth flange section projecting generally vertically upwards in relation to said third flange section, and a fifth flange section projecting generally parallel to said inner roof panel and by which said retainer member is secured to said inner roof panel;

a weatherstrip securely supported by said retainer member to maintain a seal between said lid member and said roof panel, said weatherstrip extending endlessly along said peripheral edge of said lid member and having a bottom surface which is in tight contact with a surface of said horizontal wall of said roof panel;

a top surface portion in proper coordination with said outer panel to form a junction with said lid member and said weatherstrip, a first u-shaped section including two legs, each of said legs engaging a respective opposite side of said retainer member such that a first one of said legs is between one side of said retainer member and said peripheral edge, and a second one of said legs is located below said retainer member engaging another side of said retainer member, opposite said one side abutting a corner between said first and second flange sections of said retainer, and a second sealing section attached to said first section and extending between said retainer member and said step section, said bottom surface and said top surface portion being part of said second sealing section for maintaining a seal to prevent water from penetrating from outside to inside said lid member.

* * * * *